(12) United States Patent
Ni

(10) Patent No.: US 6,296,589 B1
(45) Date of Patent: Oct. 2, 2001

(54) GEAR ENGAGING STEPLESS SPEED VARIATOR WITH ORIENTATIONAL ON-OFF DEVICE

(76) Inventor: Jin Liang Ni, Guo Men Village, Bei Men Town, Shang Rao City, Jiang Xi Province (CN)

( * ) Notice: Subject to any disclaimer, the term of this patent is extended or adjusted under 35 U.S.C. 154(b) by 0 days.

(21) Appl. No.: 09/361,148

(22) Filed: Jul. 27, 1999

Related U.S. Application Data

(63) Continuation-in-part of application No. 09/060,382, filed on Apr. 15, 1998.

(51) Int. Cl.[7] .............................. F16H 35/02; F16H 29/00
(52) U.S. Cl. ............................. 475/221; 475/16; 74/117; 74/119; 74/143
(58) Field of Search ................................ 475/221, 14, 16; 74/116, 117, 119, 143

(56) References Cited

U.S. PATENT DOCUMENTS

| | | | |
|---|---|---|---|
| 1,045,582 | * 11/1912 | Messer | 74/119 |
| 1,390,522 | * 9/1921 | Fisher | 475/217 |
| 2,088,540 | * 7/1937 | Telliez | 475/16 |
| 2,997,888 | * 8/1961 | Rust | 74/119 |
| 3,188,044 | * 6/1965 | Epple | 74/425 X |
| 3,726,150 | * 4/1973 | Ikeda | 475/5 |
| 3,999,444 | * 12/1976 | Willman | 474/1 |
| 4,109,551 | * 8/1978 | Nemec | 475/217 X |
| 4,762,022 | * 8/1988 | Johnshoy | 475/221 |
| 4,819,512 | * 4/1989 | Azuma et al. | 475/221 X |

* cited by examiner

Primary Examiner—Charles A Marmor
Assistant Examiner—Ha Ho
(74) Attorney, Agent, or Firm—Smith, Gambrell & Russell, LLP

(57) ABSTRACT

A gear engaging stepless speed variator having orientational ON-OFF properties of worm transmission for a gear transmission mechanism to realize ON-OFF orientation, so as to achieve stepless speed change of gear engagement. The variator has an orientational ON-OFF device having two sets of ON-OFF mechanisms, each set of ON-OFF mechanisms contains a driving worm, driven worm, a pair of driving gears, a pair of driven gears and a worm wheel. The power output device has two sets of differential gear composed of a frame and four bevel gears mounted in the frame, and an output shaft, and is provided with a speed adjustment device such that through an eccentric mechanism and the speed adjustment device it realizes output of rotary motion with stepless change of speed.

8 Claims, 4 Drawing Sheets

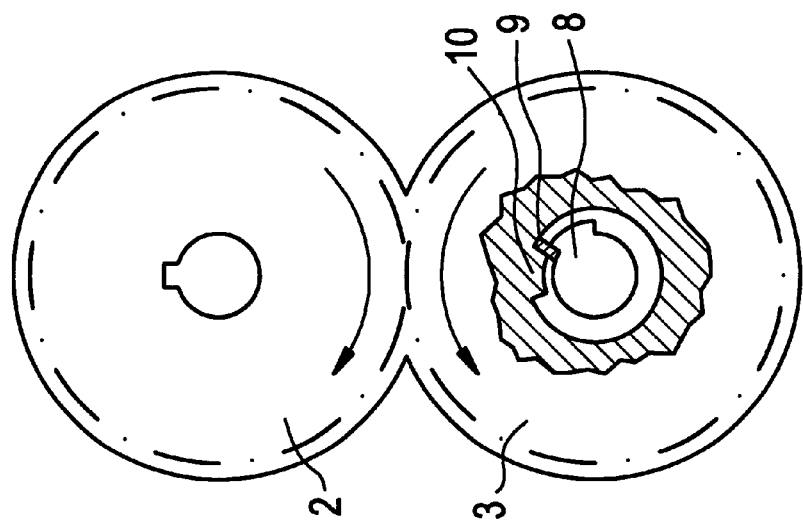
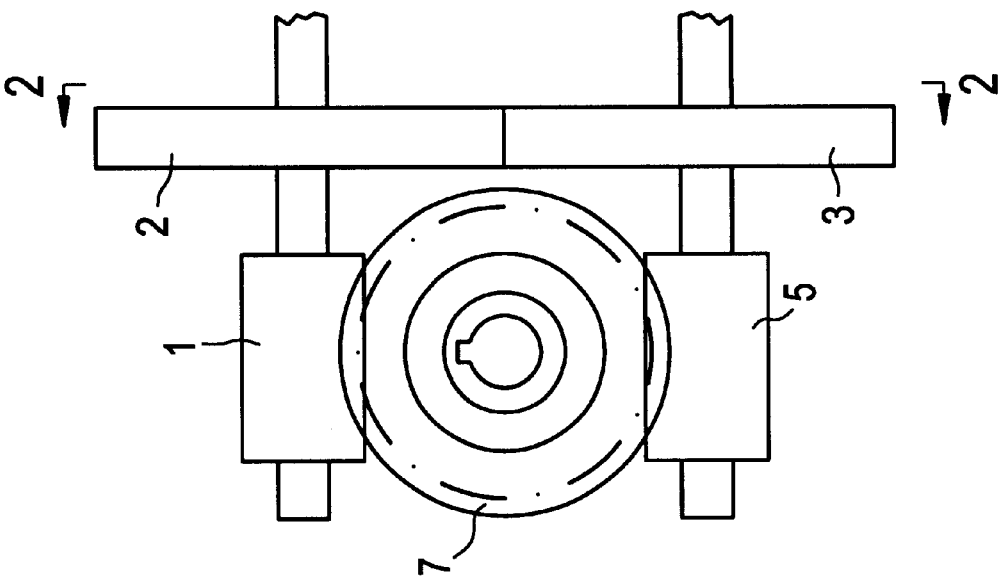

GEAR ENGAGING STEPLESS SPEED VARIATOR WITH ORIENTATIONAL ON-OFF DEVICE

This Application is a continuation-in-part of patent applicaition Ser. No. 09/060,382 Filed on Apr. 15, 1998.

BACKGROUND OF THE INVENTION

1. Field of the Invention

The present invention relates to a stepless speed variator, especially to a stepless speed variator incorporated with a gear engaging orientational ON-OFF device.

2. Description of the Background Art

Along with the increasing development of engineering technique, the application of speed variatiors becomes more and more extensive. There have been a plurality of stepless speed variators used as mechanical, electrical (thyristor speed adjustment), and hydraulic (hydraulic motor speed adjustment), etc. The electrical and the hydraulic speed variators have rather narrow range of speed variation, high loss of efficiency and during variation they can not arrive at the result of inversely proportional torque output from any switching of torque and rotary speed. Among the mechanical speed variators there have been frictional wheel type, belt chain type and sleeve pawl type, etc., which primarily apply frictional force to transmit motion and power. Due to lower efficiency and limited power transmission of the frictional transmission there exists currently no technique in stepless speed variations with high efficiency and large power transmission by means of friction-drive. It is well known in practice that gear engaging variators allow high efficiency for large power transmission. However, up to the present it has not been possible to produce stepless speed variators in the way of gear engaging transmission without utilization of friction drive. This has become a difficult subject in the world.

And, up to now the self-locking feature of worm and worm wheel engagement transmission has still not yet obtained proper exploitation in the machinery industries, formerly only the ever going feature of clockwise and counterclockwise inputs of worm is known. However, the valuable feature and applied technique of its orientational ON-OFF performance is still not yet attached great importance by people.

SUMMARY OF THE INVENTION

The object of the present invention is to provide a gear engaging orientation ON-OFF device for realization of a stepless speed variator, that is, the realization of a stepless speed variator is by means of a gear engaging orientational ON-OFF device provided by the present invention without utilization of friction drive.

Since years of investigation, the inventor has discovered the orientational ON-OFF performance in worm and worm wheel engaged transmission and made a so-called orientational ON-OFF device with gear engaging transmission to realize a stepless speed variator without utilization of friction drive.

The orientational ON-OFF device provided by the present invention comprises a driving worm, a driven worm, a pair of driving and driven gears, and a worm wheel, wherein the driven worm has a projecting portion at the end portion of the driven worm shaft; the driven gear has a shaft hole in the center portion thereof and is provided with a projecting portion in the shaft hole; the driving worm and the driven worm are equal in spiral direction, spiral angle, number of teeth and the module, and respectively mounted parallel and in engagement with the worm wheel; the driving gear and the driven gear are equal in number of teeth and in the module, the driving gear is fixed on the shaft portion of the driving worm, the driven gear is rotationally mounted through the shaft hole on the end portion of the driven worm shaft so as for the projecting portion in the shaft hole to be in oppositely adjacent position at the side portions with the projecting portion of the end portion of the driven worm shaft; and the driving gear is engaged with the driven gear. In addition, between the two projecting portions which are in oppositely adjacent position at the side portions, there may set up a damping spacer in order to regulate the gap.

The stepless speed variator, realized by means of the orientational ON-OFF device provided by the present invention, comprises two sets of the orentational ON-OFF device, a power output device and a speed adjustment device, wherein the orientational ON-OFF device is the same as the above described.

The power output device comprises two sets of differential gear, and an output gear fixed on an output shaft, wherein each differential gear contains a tie frame, with two bevel gears as sun gears and two bevel gears as planet gears therein, the sun bevel gears are mounted oppositely on the left and right two sides in the tie frame, one of the sun bevel gears is fixed on the end of the shaft of the driving worm, while the other is fixed on the end of the output shaft; the planet bevel gears are free-rotationally mounted oppositely on the upper and lower two sides in the tie frame with their adjacent teeth in engagement with the sun gears; the tie frames are therefore in transmission connection through one of the sun bevel gears therein respectively with the end of the shaft of the driving worms at the side of the tie frames; the output shaft is fixed respectively at the two ends with the other sun bevel gears in the tie frames, the output gear is fixed in the middle of the output shaft, and at the lower side of the tie frames at a position adjacent to the output gear there is provided respectively a lug with a ball hinge fitted thereon. The tie frame supports the sun bevel gears and the planet bevel gears in the frame such that the four bevel gears can rotate smoothly engaging with each other in the tie frame.

The speed adjustment device comprises a push rod, two connecting rods, two links, an eccentric and a diving rushing mechanism, wherein the driving-pushing mechanism comprises a hand wheel, a rocker, and a lead screw handled by the hand wheel; the lead screw is mounted in the rocker which is placed at the lower side of the two differential gear tie frames; the left side of the rocker is pivotedly fixed on the housing as a fixed fulcrum by a pin; the push rod is provided with a central hole in its middle portion and a hole at one side of the central hole, and provided each with a ball hinge at the left and right two sides of its upper portion, the push rod is pivotedly mounted on the housing through the central hole at its middle portion with a pin and is located between the tie frames and the rocker; one end of the second link is pivotedly connected with the push rod at the side hole by a pin, the other end is pivotedly connected with a slider engaged with the lead screw; the two ends of the two connecting rods are connected respectively by ball hinges to the left and right side holes at the upper portion of the push rod, and the other two ends being respectively connected with the ball hinges on the lugs at the lower portion of the two tie frames; the eccentric is pivotedly mounted by pin shaft on the housing under the rocker; and, the two ends of the first link are pivotedly connected by pins respectively at the right side of the rocker and at the adjacent peripheral edge of the eccentric.

BRIEF DESCRIPTION OF DRAWINGS

The manner in which the foregoing and other objects of this invention are accomplished will be apparent from the following description of preferred embodiments of the present invention with reference the accompanying drawings, wherein:

FIG. 1 is a schematic diagram of a orientational ON-OFF device in the present invention.

FIG. 2 is a view in section of the construction of FIG. 1, as seen along the lines A—A.

DESCRIPTION OF THE PREFERRED EMBODIMENT

Figure 3:
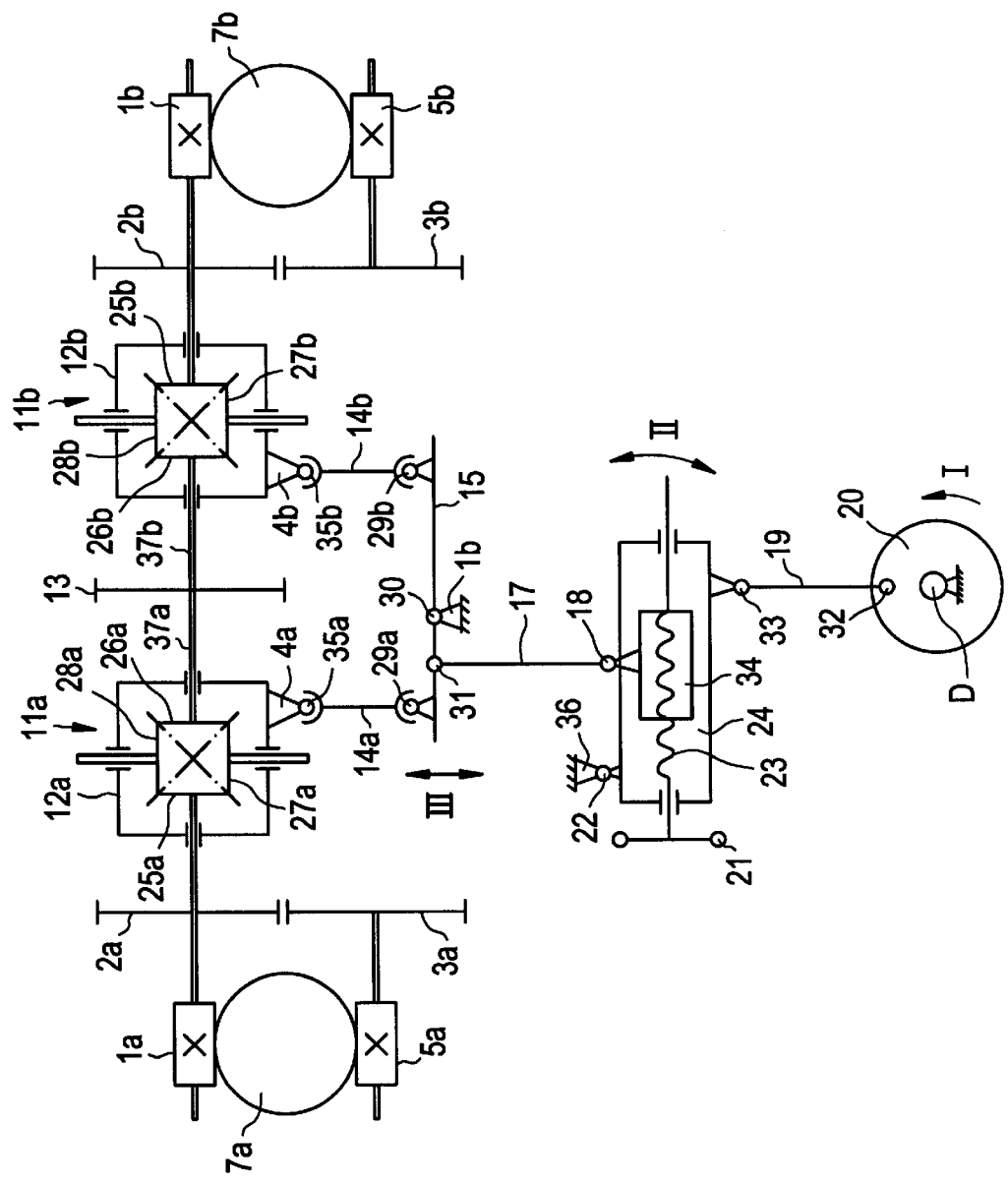
FIG. 3 is a kinematic diagram of a gear engaging stepless speed variator with two sets of orientational ON-OFF device in the present invention.

Referring now to FIG. 1 and FIG. 2, the orientational ON-OFF device comprises a driving worm 1, a driven worm 5, a driving gear 2, a driven gear 3, and a worm wheel 7. One end of the driven worm 5 has an integral or fixedly connected boss 8, while in the shaft hole of the driven gear 3 there is also made integral with a boss 10, the driving gear 2 is fixedly fitted to the shaft end of the driving worm 1 to engage the driven gear 3. Now, the boss 10 of driven gear 3 is at a sidewise adjacent position with the boss 8 of the shaft end of driven worm 5, between the boss 10 and boss 8 is provided in addition a damping spacer 9 for adjusting gear clearance. The spiral direction, spiral angle, number of teeth, and module of said driving worm 1 and driven worm 5 are all the same. The number of teeth and module of the driving and driven gears 2, 3 are identical. These are the basic characteristics of the five members of the present device.

In case of having the driving gear 2 and driven gear 3 removed, the remaining three members as the driving worm 1, driven worm 5, and worm wheel 7 as shown in FIG. 1 are doubtlessly in a locked state i.e. OFF state to any worm input rotation, and only when these five members being in mutual engagement as shown in FIG. 1 then there will be a orientational ON-OFF device to form, i.e. the rotation of the driving worm 1 from a set direction is unlocked i.e. ON state and locked i.e. OFF state to another direction of rotation, this is the conception of the orientational ON-OFF device provided in the present invention. In time of design, the boss 8 and boss 10 can be chosen as left or right offset at will, so as to readily make said device arbitrarily have a positive or negative ON-OFF function.

As shown in FIG. 1 and FIG. 2, when the driving worm 1 inputs a rotation in certain direction (as set in FIG. 1 being in counterclockwise direction unlocked i.e. ON), the counterclockwise rotation of driving gear 2 can drive the driven gear 3 in clockwise rotation, then the boss 10 in the shaft hole of driven gear 3 through the spacer 9 will contact the boss 8 at the shaft end of driven worm 5 to bring the driven worm 5 together into clockwise rotation. Now the device will be in an unlocked i.e. ON state.

When the driving worm 1 inputs another direction of rotation (as set in FIG. 1 being in clockwise direction locked i.e. OFF) and the clockwise rotation of the driving gear 2 can drive the driven gear 3 in counterclockwise rotation, the boss 10 will separate the boss 8 from contact (at an almost imperceptible distance about microns). Such a rotation will at once lock the driven worm 5. Now said device is in a locked i.e. OFF state. Actually the state of the boss 8 separating the boss 10 from contact is just like that of the remaining three members mentioned above in an always locked i.e. OFF state composed of the driving worm 1, driven worm 5 and worm wheel 7.

Figure 4:
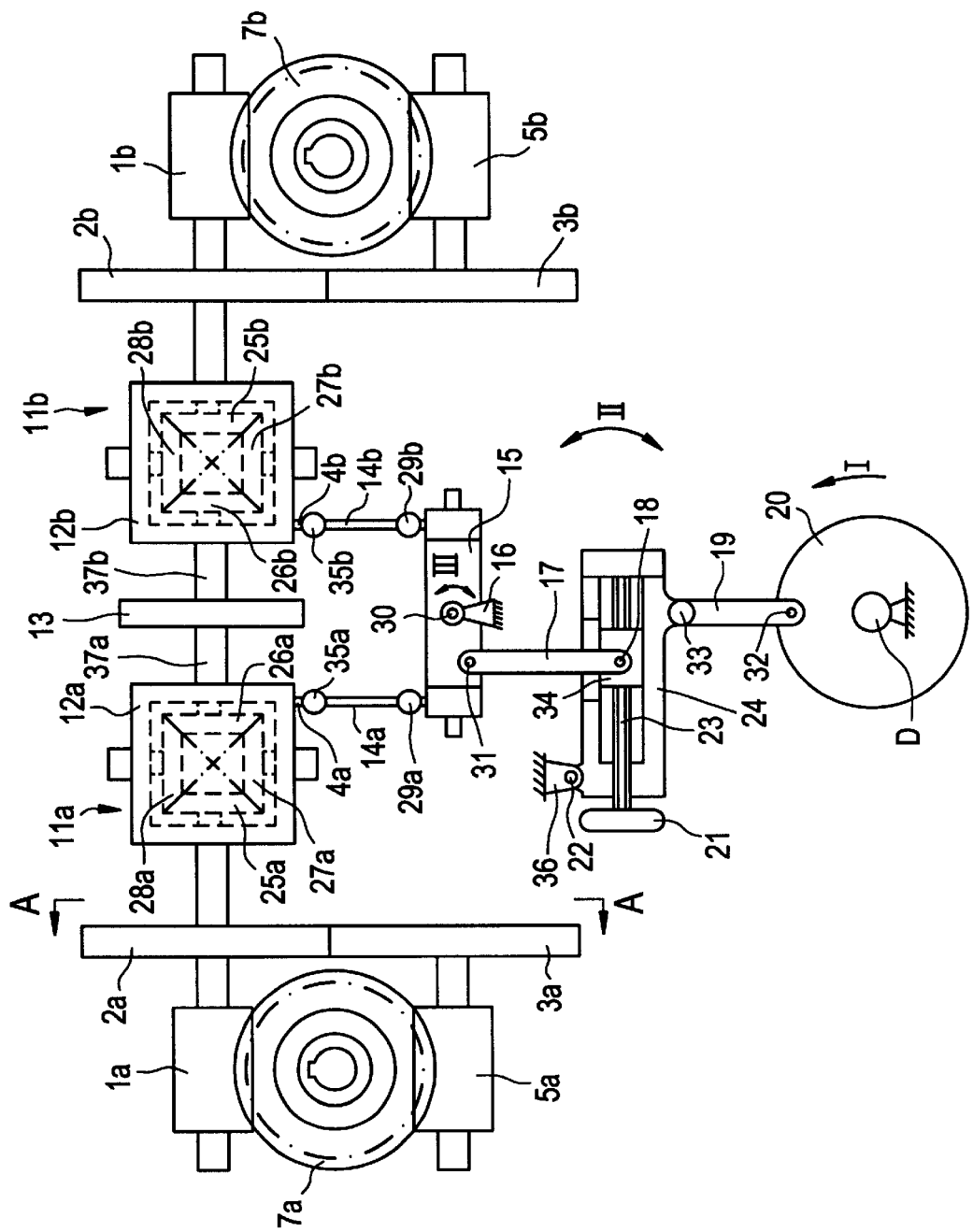
FIG. 4 is a schematic diagram of the gear engaging stepless speed variator in FIG. 3.

Referring now to FIG. 3 and FIG. 4, the stepless speed variator, realized by means of the orientational ON-OFF device provided by the present invention, comprises two sets of the orientational ON-OFF device, a power output device and a speed adjustment device, wherein the orientational ON-OFF devices are the same as the above described.

The power output device comprises two sets of differential gear 11a, 11b and an output gear 13 fixed on an output shaft 37, wherein each differential gear 11a, 11b contains a tie frame 12a, 12b, with two bevel gears 25, 26 as sun gears and two bevel gears 27, 28 as planet gears; the sun bevel gears 25, 26 are mounted oppositely on the left and right two sides in the tie frames 12, one of the sun bevel gears 25 is fixed on the end of the shaft of the driving worm 1, while the other 26 is fixed on the end of the output shaft 37; the planet bevel gears 27, 28 are free-rotationally mounted oppositely on the upper and lower two sides in the tie frame 12 with their adjacent teeth in the transmission engagement with the sun bevel gears 25,26; the tie frames 12a 12b therefore are in transmissive connection through the sun bevel gears 25a, 26b therein respectively with the end of the shaft of the driving worms 1a, 1b at the side of the tie frames 12a, 12b; the output shaft 37 is fixed respectively at the two ends thereof with the sun bevel gears 26a, 26b in the tie frames 12a, 12b; the output gears 13 is fixed at the middle of the output shaft 37; and, at a position adjacent to the output gear 13 at the lower side of the tie frames 12a, 12b there is provided respectively a lug 4a, 4b with a ball hinge 35a, 35b filled thereon; the tie frames 12a, 12b support the sun bevel gears 25, 26 and the planet bevel gears 27, 28 in the frames 12a, 12b such that the four bevel gears 25, 26, 27, 28 can rotate smoothly engaging with each other in the tie frame 12.

The speed adjustment device comprises a push rod 15, two connecting rods 14a, 14b, a first link 19, a second link 17, an eccentric 20 and a driving pushing mechanism wherein the driving-pushing mechanism comprises a hand wheel 21, a rocker 24 and a lead screw 23 controlled by the hand wheel 21; the lead screw 23 is mounted in the rocker 24 which is placed at the lower side of the two different gear tie frames 12a, 12b; the left side of the rocker 24 is pivotedly fixed on the boss 36 of the housing as a fixed fulcrum with a pin 22; the push rod 15 is provided with a central hole 30 in its middle portion and a hole 31 at one side of the central hole 30, and provided each with a ball hinges 29a, 29b at the left and right sides of its upper portion; the push rod 15 is located between the tie frames 12 and the rocker 24, and is pivotedly mounted on the housing through the central hole 30 at its middle portion with a pin; one end of the second link 17 is pivotedly connected with the push rod 15 at the side hole 31 by a pin, the other end is pivotedly connected through a pin 18 with a slider 34 engaged with the lead screw 23; the two ends of the two connecting rods 14a, 14b are connected by the ball hinges 29a, 29b to the left and right side holes at the upper portion of the push rod 15, and at the other two ends of the connecting rods 14a, 14b are connected respectively with the ball hinges 35a, 35b on the lugs 4a, 4b at the lower portion of the two tie frames 12a, 12b; the eccentric 20 is pivotedly mounted with a shaft 0 on the housing under the rocker 24; and, the two ends of the first link 19 are pivotedly connected respectively by shaft pins 33, 32 at the right lower portion of the rocker 24 and at the adjacent peripheral edge of the eccentric 20. Referring to FIG. 3 and FIG. 4, the eccentric 20 driven by a prime mover rotates in the direction along arrow head I. The first link 19 driven by the eccentric shaft pin 32 through the shaft pin 33 brings the rocker 24 around the shaft pin 22 on a lug 36 of the housing into reciprocating swing along arrow head II. It needs to point out that the reciprocating stroke of the rocker 24 on arrow head II is restricted by the eccentricity from axis 0 to axis of the shaft pin 32 although its swing amplitude remains constant. However, the slider 34 through rotating the handwheel 21 to actuate the lead screw 23 can be moved all the way in a longitudinal direction along the rocker 24, i.e. with the pin axis 22 at the lug 36 of the housing as pivot to make centrifugal or centripetal motion. Such kind of move can make the slider 34 together with the pin 18 choose arbitrarily a zero or maximum swing amplitude. The pin 18 on the slider 34 will bring the second link 17 through the pin 31 to make the push rod 15 around the pin shaft 30 at the lug 16 of the housing perform reciprocating swing along arrow head III. It needs to point out herein that the swing amplitude of the push rod 15 is controlled by the hand wheel 21 after being rotated and determined by the position of the slider 34 being disposed. Hence the swing amplitude of the push rod 15 is controlled by the hand wheel 21 in stepless regulation. Hereto, the swinging of the rocker 24 actuated by the eccentric 20 in the view of its swing stroke has transformed into a controllable stepless swing amplitude motion of the push rod 15 around the pivot pin 30.

As shown in FIG. 3 and FIG. 4, both ends of the push rod 15 are provided with two ball hinges 29a, 29b, equidistantly disposed to the pivot pin 30. Being connected in ball hinges respectively with ends of the two connecting rods 14a, 14b and again connected with two ball hinges 35a, 35b disposed at the lugs 4a, 4b of tie frames 12a, 12b, each reciprocating swing of the push rod 15 can make, according to FIG. 5, the connecting rods 14a, 14b perform up and down on arrow head positive and negative cyclic rectilinear motions, so as to push and pull the tie frames 12a, 12b respectively by itself in synchronous swinging in reverse direction.

Figure 5:
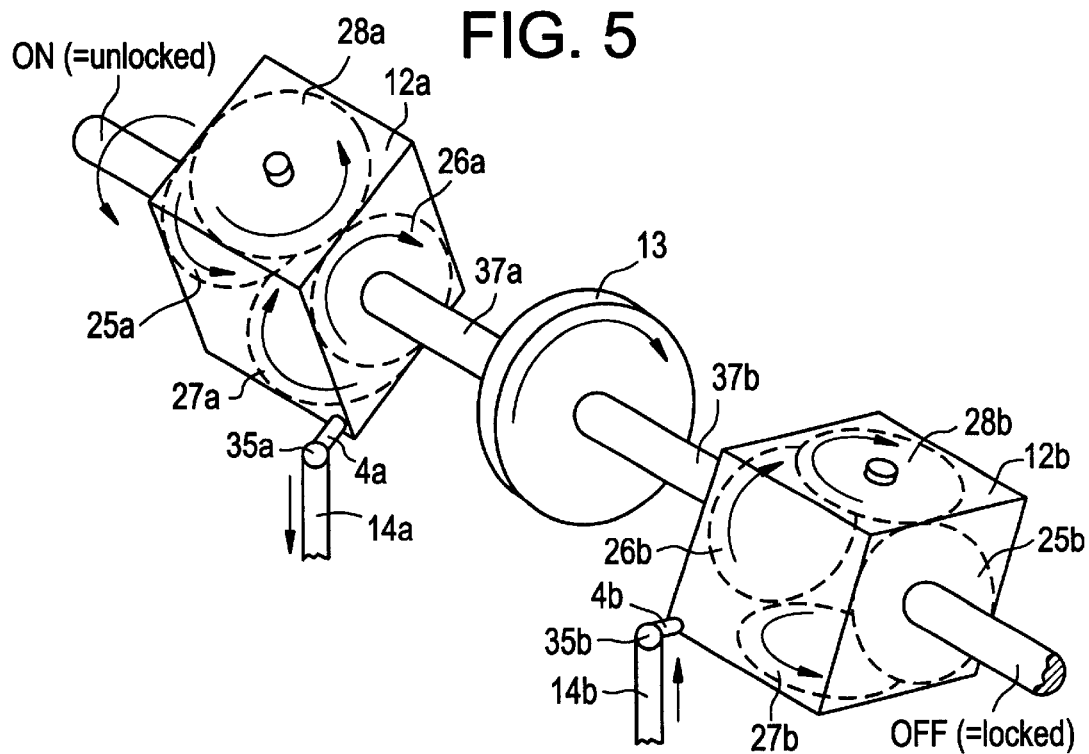
FIG. 5 is a partial perspective view of the variator in FIG. 4 showing power transmission by moving up of the right side connecting rod.

Referring to FIG. 5, the connecting rod 14b on arrow head upward pushes the tie frame 12b clockwise to rotate a half-cycle (generally one reciprocation or two strokes to make one cycle), because the bevel gear 25b in the tie frame 12b under design arrangement of the right side orientational ON-OFF device in a clockwise rotation is locked by a driving worm 1b, simultaneously to make bevel gears 27b, 28b rotate around the bevel gear 25b, it will be certain to push the bevel gear 26b which is fixedly connected with the output shaft 37b, together with the output gear 13 in clockwise rotation to deliver a half-cycle rotary power. The output shaft 37a and the bevel gear 26a fixedly connected at the left side of the output gear 13 also rotate in a clockwise direction, as shown at the left side of FIG. 5, but the bevel gear 25a will make a counterclockwise rotation because it simultaneously meets the connecting rod 14a to pull the tie frame 12a downward on arrow head to make counterclockwise rotation. Since the bevel gear 25a in the tie frame 12a is similarly under design arrangement to be unlocked by counterclockwise rotation of the left side orientational ON-OFF device, the bevel gears 27a, 28a when rotating in reverse direction around the bevel gear 26a will with a force resultant from moment of positive and negative two rotations push 25a already unlocked by the left side orientational ON-OFF device to make counterclockwise idling. The inventor calls it a powerless unloading, i.e. no transfer of power taking place during the connecting rod 14a pulling downward the tie frame 12a to rotate and being a sheer useless idling of counterclockwise rotation. Bevel gears in said tie frame driving the half-cycle of the tie frame 12a in counterclockwise rotation consume only negligible bearing friction power loss.

Figure 6:
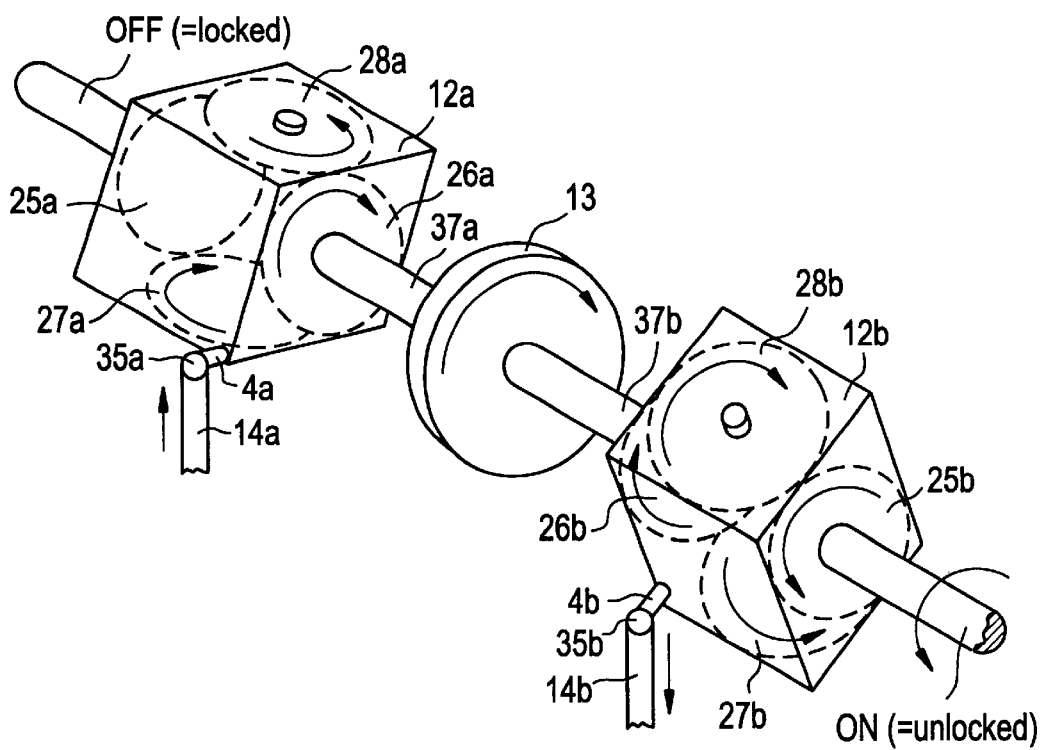
FIG. 6 is a partial perspective view of the variator in FIG. 4 showing power transmission by moving up of the left side connecting rod.

Referring to FIG. 6, it is a condition of the push rod 15 during another half-cycle to make the connecting rod 14a upward on arrow head push the tie frame 12a in clockwise rotation, and is a condition going round and round and identical with that mentioned above. Since the orientational ON-OFF device at both left and right sides are let unlock, in turn to move in cycles, the bevel gears 25a, 25b belonging to the third freedom in tie frames 12a, 12b (12a, 12b are of a differential gear structure and all differentials have three freedoms) during counterclockwise rotation in half-cycle stroke. Simultaneously the orientational ON-OFF devices at both left and right sides are let again in turn lock up the bevel gears 25a, 25b belonging to the third freedom in tie frames 12a, 12b during clockwise rotation in another half-cycle stroke, thus 12a, 12b will make the two half-cycle rotation forces in clockwise rotation to add up on the output gear 13, which will be delivered by the output gear 13 as full cycle, full power output.

It can be seen from the above description that the path of power transfer is as such: The input of rotary motion through the eccentric mechanism 20 and the speed adjusting device is transformed into up and down swings of stepless amplitude variation of the push rod 15, the swings through the connecting rods 14a, 14b to push and pull the tie frames 12a, 12b are transformed into clockwise and counterclockwise rotations of stepless speed variation. The two clockwise rotations of tie frames 12a, 12b are again through the orientational ON-OFF devices at both left and right sides under an automatic switching action of being set as clockwise locked i.e. OFF counterclockwise unlocked i.e. ON same as a diode, delivered after adding up or overlapping, and the two counterclockwise rotations are let unload to idle. It needs to point out in particular that the orientational ON-OFF device itself does not take part in power transfer and only lock up 25a, 25b in tie frames 12a, 12b at the instant of clockwise rotation, hence it receives only the idling or reaction force of output power. The disadvantages of the traditional worm gears in the past as readily giving out heat and low efficiency are ingeniously evaded herein.

While the invention has been described by reference to specific embodiments, it should be understood and obvious to those skilled in the art that various alterations and modifications of structure may be made without departing from the spirit of the present invention as defined by the claims. Thus, the disclosure is for the purpose of illustration, only, and is not intended to limit the invention except as it may be limited by the claims.

What is claimed is:

1. A gear engaging stepless speed variator for realization of friction drive-free stepless speed variation comprising:

two sets of orientational ON-OFF device;

a power output device, being connected with the two sets of the orientational ON-OFF device, for full cycle and full power output; and a speed adjustment device, being connected with the power output device, for handling of stepless speed variation, wherein the orientational ON-OFF device comprises a driving worm, a driven worm, a pair of driving and driven gears, and a worm wheel, wherein a) the driven worm having a projecting portion at an end portion of the driven worm shaft,
b) the driven gear having a shaft hole in the center portion thereof and being provided with a projecting portion in the shaft hole,
c) the driving worm and the driven worm being equal in spiral direction, spiral angle, number of teeth and the module, and respectively mounted parallel and in engagement with the worm wheel,
d) the driving gear and the driven gear being equal in number of teeth and in the module, the driving gear being fixed on the shaft portion of the driving worm, the driven gear being rotationally mounted through the shaft hole on the end portion of the driven worm shaft so as for the projecting portion in the shaft hole to be in oppositely adjacent position at the side portions with the projecting portion of the end portion of the driven worm shaft, and
e) the driving gear being engaged with the driven gear.

2. The gear engaging stepless speed variator according to claim 1, wherein the orientational ON-OFF device further comprises a damping spacer being set up between the two projecting portions in oppositely adjacent position at side portions thereof.

3. The gear engaging stepless speed variator according to claim 1, wherein the power output device comprises two sets of differential gear and an output gear being fixed on an output shaft, wherein each differential gear containing a tie frame, with two bevel gears as sun gears and two bevel gears as planet gears therein, the sun bevel gears being mounted oppositely on the left and right two sides in the tie frame, one of the sun bevel gears being fixed on the end of the shaft of the driving worm, the other being fixed on the end of the output shaft; the planet bevel gears being free-rotationally mounted oppositely on the upper and lower two sides in the tie frame with their adjacent teeth in engagement with the sun gears; the tie frames being in transmission connection through one of the sun bevel gears therein respectively with the end of the shaft of the driving worms at the side of the tie frames; the output gear being fixed in the middle of the output shaft, the output shaft being fixed respectively at the two ends with the sun bevel gears in the tie frames; and at the lower side of the tie frames at a position adjacent to the output gear there being provided respectively a lug with a ball hinge fitted thereon.

4. The gear engaging stepless speed variator according to claim 1, wherein the speed adjustment device comprises a push rod, two connecting rods, a first link, a second link, an eccentric and a driving-pushing mechanism, wherein the driving-pushing mechanism having a hand wheel, a rocker and a lead screw handled by the hand wheel; the lead screw being mounted in the rocker, the rocker being placed at the lower side of two tie frames; the left side of the rocker being pivotedly fixed on the housing by a pin; the push rod being provided with a central hole in its middle portion and a hole at one side of the central hole and being provided each with a ball hinge at the left and right two sides of the upper portion thereof; the push rod being pivotedly mounted on the housing through the central hole with a pin and being located between the tie frames and the rocker; one end of the second link being pivotedly connected with the push rod at the side hole by a pin, the other end being pivotedly connected with a slider engaged with the lead screw; the two ends of the two connecting rods being connected respectively by ball hinges to the left and right side holes at the upper portion of the push rod, the other two ends being respectively connected with the ball hinges on the lugs at the lower portion of the two tie frames;

the eccentric being pivotedly mounted by pin shaft on the housing under the rocker; and the two ends of the first link being pivotedly connected by pins respectively at the right side of the rocker and at the adjacent peripheral edge of the eccentric.

5. A gear engaging stepless speed variator for realization of friction drive-free stepless speed variation comprising:

two sets of orientational ON-OFF device;

a power output device, being connected with the two sets of the orientation ON-OFF device, for fully cycle and full power output; and a speed adjustment device, being connected with the power output device, for handling of stepless speed variation, wherein the speed adjustment device comprises a push rod, two connecting rods, a first link, a second link, an eccentric and a driving-pushing mechanism, wherein the driving-pushing mechanism having a hand wheel, a rocker and a lead screw handled by the hand wheel; the lead screw being mounted in the rocker, the rocker being placed at the lower side of two tie frames; the left side of the rocker being pivotedly fixed on the housing by a pin; the push rod being provided with a central hole in its middle portion and a hole at one side of the central hole and being provided each with a hall hinge at the left and right two sides of the upper portion thereof; the push rod being pivotedly mounted on the housing through the central hole with a pin and being located between the tie frames and the rocker; one end of the second link being privotedly connected with the push rod at the side hole by a pin, the other end being pivotedly connected with a slider engaged with the lead screw; the two ends of the two connecting rods being connected respectively by ball hinges to the left and right side holes at the upper portion of the push rod, the other two ends being respectively connected with the ball hinges of the lugs at the lower portion of the two tie frames;

the eccentric being pivotedly mounted by pin shaft on the housing under the rocker; and the two ends of the first link being pivotedly connected by pins respectively at the right side of the rocker and at the adjacent peripheral edge of the eccentric.

6. An orientational ON-OFF device, comprises a driving worm, a driven worm, a pair of driving and driven gears, and a worm wheel, wherein a) the driven worm having a projecting portion at the end portion of the driven worm shaft,
b) the driven gear having a shaft hole in the center portion thereof and being provided with a projecting portion in the shaft hole,
c) the driving worm and the driven worm being equal in spiral direction, spiral angle, number of teeth and the module, and respectively mounted parallel and in engagement with the worm wheel,
d) the driving gear and the driven gear being equal in number of teeth and in the module, the driving gear being fixed on the shaft portion of the driving worm, the driven gear being rotationally mounted through the shaft hole on the end portion of the driven worm shaft so as for the projecting portion in the shift hole to be in oppositely adjacent position at the side portions with the projecting portion of the end portion of the driven worm shaft, and e) the driving gear being engaged with the driven gear.

7. The orientation ON-OFF device according to claim 6, wherein a damping spacer is set up between the two projecting portions in oppositely adjacent position at side portions thereof.

8. A gear engaging stepless speed variator for realization of friction drive-free stepless variation comprising:

two sets of orientational ON-OFF device;

a power output device, being connected with the two sets of the orientational ON-OFF device, for fall cycle and full power output; and a speed adjustment device, being connected with the power output device, for handling of stepless speed variation, wherein the power output device comprises two sets of differential gear and an output gear being fixed on an output shaft wherein each differential gear containing a tie frame, with two bevel gears as sun gears and two bevel gears as planet gears therein, the sun bevel gears being mounted oppositely on the left and right two sides in the tie frame, one of the sun bevel gears being fixed on the end of a shaft of a driving worm, the other being fixed on the end of the output shaft; the planet bevel gears being free-rotationally mounted oppositely on the upper and lower two sides in the tie frame with their adjacent teeth in engagement with the sun gears; the tie frames being in transmission connection through one of the sun bevel gears therein respectively with the end of the shaft of the driving worms at the side of the tie frames;

the output gear being fixed in the middle of the output shaft, the output shaft being fixed respectively at the two ends with the sun bevel gears in the tie frames; and at the lower side of the tie frames at a position adjacent to the output gear there being provided respectively a lug with a ball hinge fitted thereon.

\* \* \* \* \*